United States Patent [19]

Gettemy

[11] Patent Number: 5,164,567
[45] Date of Patent: Nov. 17, 1992

[54] LASER CUTTING WITH CHEMICAL REACTION ASSIST

[75] Inventor: Donald J. Gettemy, Los Alamos, N. Mex.

[73] Assignee: The United States of America as represented by the United States Department of Energy, Washington, D.C.

[21] Appl. No.: 681,293

[22] Filed: Apr. 8, 1991

[51] Int. Cl.⁵ ............................................. B23K 26/00
[52] U.S. Cl. .......................... 219/121.72; 219/121.84; 219/121.67
[58] Field of Search ...................... 219/121.67, 121.72, 219/121.84

[56] References Cited

U.S. PATENT DOCUMENTS 4,689,467 8/1987 Inoue ................................ 219/121 L

OTHER PUBLICATIONS

C. S. Lee et al., "Parametric Studies of Pulsed-Laser Cutting of Thin Metal Plates", J. Appl. Phys. 58(3), pp. 1339-1343 (Aug. 1, 1985).

W. W. Duley, Laser Processing and Analysis of Materials, (Plenum Press, New York and London), p. 132.

Primary Examiner—C. L. Albritton
Attorney, Agent, or Firm—Richard J. Cordovano; Paul D. Gaetjens; William R. Moser

[57] ABSTRACT

A method for cutting with a laser beam where an oxygen-hydrocarbon reaction is used to provide auxiliary energy to a metal workpiece to supplement the energy supplied by the laser. Oxygen is supplied to the laser focus point on the workpiece by a nozzle through which the laser beam also passes. A liquid hydrocarbon is supplied by coating the workpiece along the cutting path with the hydrocarbon prior to laser irradiation or by spraying a stream of hydrocarbon through a nozzle aimed at a point on the cutting path which is just ahead of the focus point during irradiation.

3 Claims, 1 Drawing Sheet

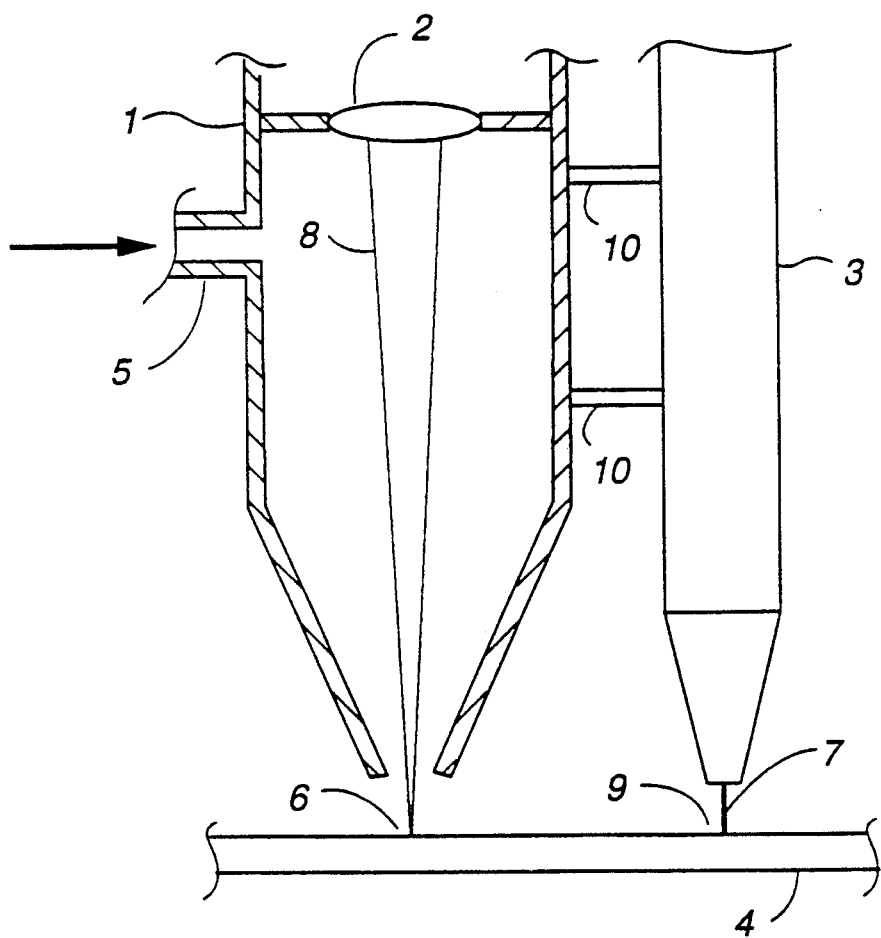

LASER CUTTING WITH CHEMICAL REACTION ASSIST

This invention is the result of a contract with the Department of Energy (Contract No. W-7405-ENG-36).

BACKGROUND OF THE INVENTION

This invention relates to the field of metal cutting and, more particularly, to the field of metal cutting using a laser.

Laser machining apparatus in which a laser beam is focused by a focusing lens to remove metal from a workpiece and where an auxiliary energy source is used to augment the energy supplied to the metal by the laser is known. The auxiliary energy source may be, for example, a plasma, a xenon light, glow discharge, corona discharge, or an auxiliary laser beam. U.S. Pat. No. 4,689,467 (Inoue) reviews methods of supplying auxiliary energy and teaches a method in which auxiliary energy is supplied to a point slightly ahead of the irradiation point rather to the irradiation point. The present invention provides a straightforward and relatively inexpensive method of providing additional energy to a laser machining process.

SUMMARY OF THE INVENTION

This invention is a method for machining, or cutting, with a laser beam where an oxygen-hydrocarbon reaction is used to provide auxiliary energy to a metal workpiece to supplement the energy supplied by the laser. Oxygen is supplied to the laser focus point on the workpiece by a nozzle through which the laser beam also passes. A liquid hydrocarbon is supplied by coating the workpiece along the cutting path with the hydrocarbon prior to laser irradiation or by spraying a stream of hydrocarbon through a nozzle aimed at a point on the cutting path which is just ahead of the focus point during irradiation.

BRIEF DESCRIPTION OF THE DRAWING

The drawing depicts a hydrocarbon spray nozzle, an oxygen delivery nozzle, and a laser beam focusing lens holder, which are positioned to cut a workpiece.

DETAILED DESCRIPTION OF THE INVENTION

Experimentation was accomplished using a Nd:YAG laser at a wave length of 1.06 micron with a 200 microsecond pulse length operating at 20 pulses/minute. The power of each pulse was 200 millijoules. The laser was operated with the front part of the pulse Q-switched such that about 10% of the power is a Q-switched pulse (however, this is not necessary to the invention). Aluminum plate having a thickness of 1/16 inch was vertically mounted in a translation stage and manually moved so that the laser beam focus point on the aluminum workpiece moved along a desired cutting path. The laser beam was passed through a focusing lens having a focal length of 20 cm. Oxygen was supplied to the point of focus of the laser beam, or point of irradiation of the beam, by passing it into a nozzle positioned to flow the oxygen onto the workpiece through which the laser beam also passed. Prior to energizing the laser, the cutting path was sprayed with a hydrocarbon fluid from a pressurized container. The focus point of the laser was moved along the cutting path. There was a bright yellow flame at the irradiation point and a "popping" sound similar to that of numerous small firecrackers exploding as the cutting took place.

The hydrocarbon may also be supplied to a point on the planned cutting path ahead of the beam focus point by means of a spray nozzle which directs a continuous hydrocarbon stream to the cutting path at the same time that the beam is irradiating and cutting the workpiece. The Drawing depicts this embodiment. Nozzle 1 is shown in a section view. Lens 2 focuses a laser beam on workpiece 4 at the point denoted by reference number 6. Reference number 8 denotes the beam. Oxygen enters nozzle 1 through conduit 5 and flows out of nozzle 1 just above irradiation point 6. Hydrocarbon nozzle 3, which is attached to nozzle 1 by brackets 10, directs a stream 7 consisting of a hydrocarbon or hydrocarbons at point 9, which is ahead of the irradiation point. The workpiece is moved so that the irradiation point moves along the desired cutting path or nozzle 1 is moved such that the irradiation point moves along the cutting path.

The hydrocarbon mixture used consisted of two approximately equal fractions, one containing alicyclic hydrocarbons having a composition ranging from $C_8H_{16}$ to $C_{13}H_{28}$ and the other containing aliphatics having a composition of from $C_{14}H_{30}$ to $C_{25}H_{52}$. It is expected that any common hydrocarbon will be effective. As used herein, hydrocarbon includes a mixture of hydrocarbons.

In laser machining, it is common to direct a gas jet coaxially with the laser beam into the interaction region, or at the focus point. There, assist gas removes liquid metal so that re-welding of the cut does not occur. Oxygen is used as an assist gas because it may react with the metal to further prevent re-welding; the metal oxide may not stick to the metal.

It is known that a violent reaction or explosion may occur when pure oxygen and a hydrocarbon are brought into contact with one another. The present invention uses this exothermic reaction to provide auxiliary energy to a workpiece to promote cutting of the workpiece. The amounts of the reactants supplied to the workpiece are controlled so that the reaction is controlled and is useful rather than destructive. It is necessary that the stream of hydrocarbons be directed to a point ahead of the irradiation point. If the stream is directed to the irradiation point, the flame may move up the stream to the hydrocarbon spray nozzle. Cutting of an aluminum workpiece was done using a hydrocarbon and no oxygen and also using oxygen but no hydrocarbon. In neither case was the cutting accomplished as well as when both oxygen and hydrocarbon were used.

It was found that the above-described laser apparatus would also cut ⅛ inch thick aluminum but would not cut ¼ inch thick aluminum. It is expected that a laser having a higher power will easily cut the thicker material; the power level of the laser used in the experimentation is quite small compared to what is commercially available. Experiments were done in which the laser was operated in a single pulse mode; this effectively cut ⅛ inch aluminum plate. Without the hydrocarbon assist, the laser beam burned a hole having a diameter of 0.006 inches.

The cuts of the 1/16 inch and ⅛ inch material were clean with no cratering build-up along the edges of the cuts. The sides of the cuts were steep, that is, they were almost perpendicular to the plane of the plates. Without use of the hydrocarbons, cuts made in 1/16 and ⅛ inch material were tapered down to a pinpoint. The track made by the laser beam in ¼ inch thick aluminum when the invention was practiced has square sides and the bottom of the cut was concave. Without hydrocarbons, the track of the beam in ¼ inch material was tapered.

What is claimed is:

1. A method for cutting metal in which an oxygen-hydrocarbon reaction is used to provide auxiliary energy to a workpiece, said method being comprised of:
   a. focusing a laser beam on a workpiece and causing the point of focus on the workpiece to move along a cutting path;
   b. supplying a stream of oxygen to said moving laser beam focus point on the workpiece; and
   c. supplying a hydrocarbon to said cutting path on the workpiece prior to laser irradiation, where said hydrocarbon reacts with said oxygen to assist in cutting said workpiece.

2. The method of claim 1 where said hydrocarbon is supplied to said workpiece in the form of a coating applied to said cutting path prior to laser irradiation.

3. The method of claim 1 where said hydrocarbon is supplied to a point on said cutting path ahead of said laser beam focus point at the time of irradiation by means of a hydrocarbon spray nozzle.

* * * * *